Patented Aug. 7, 1934

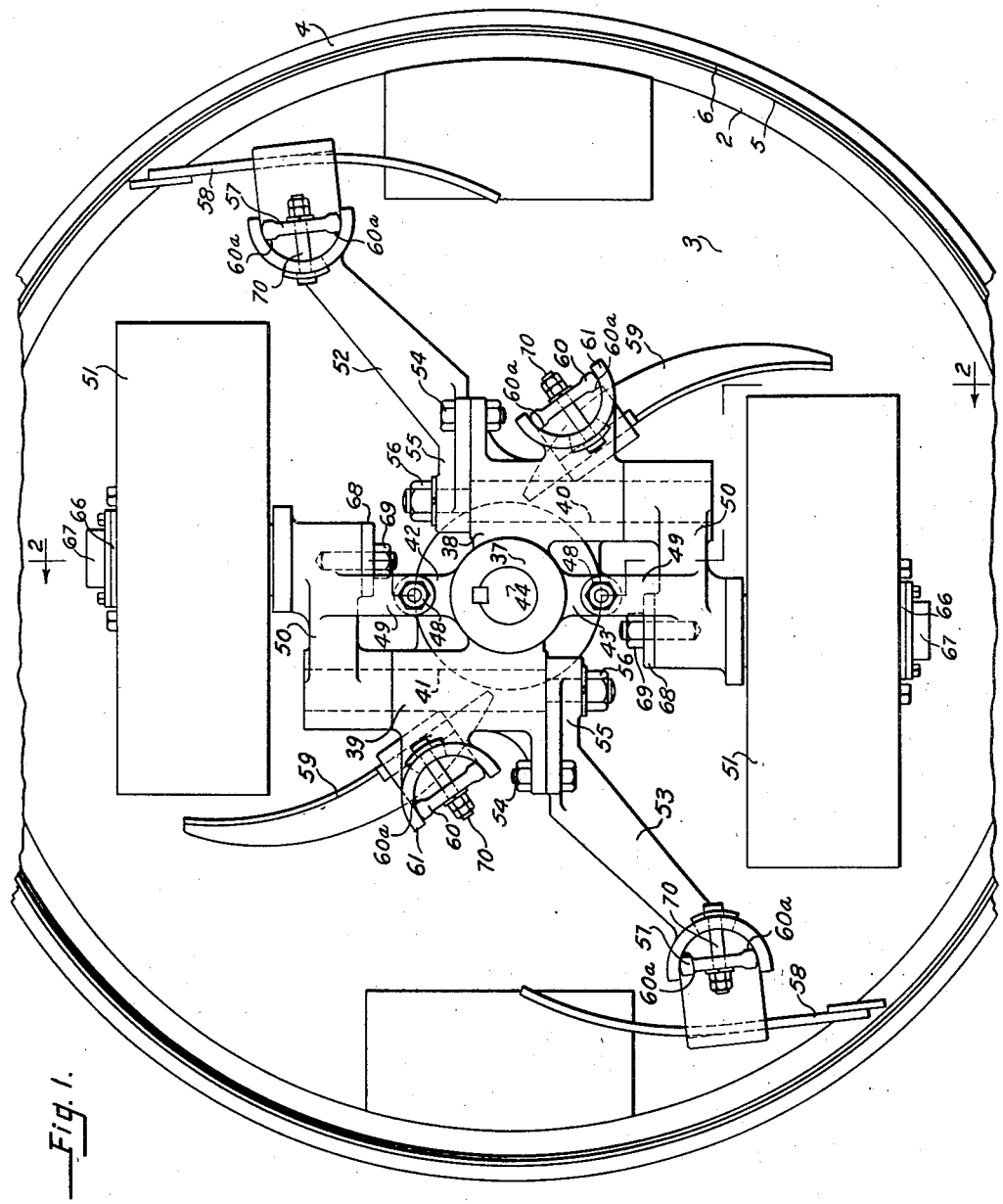

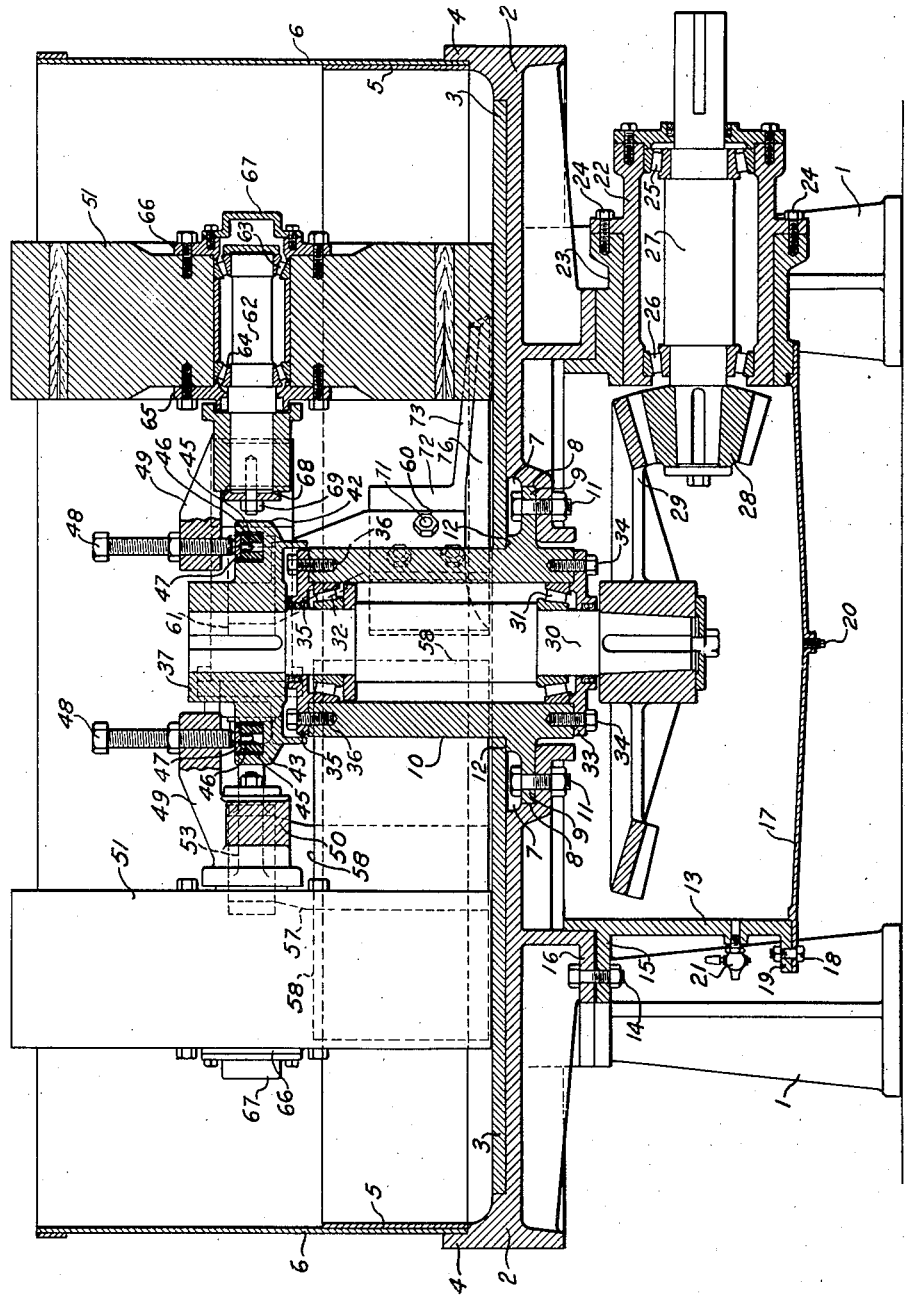

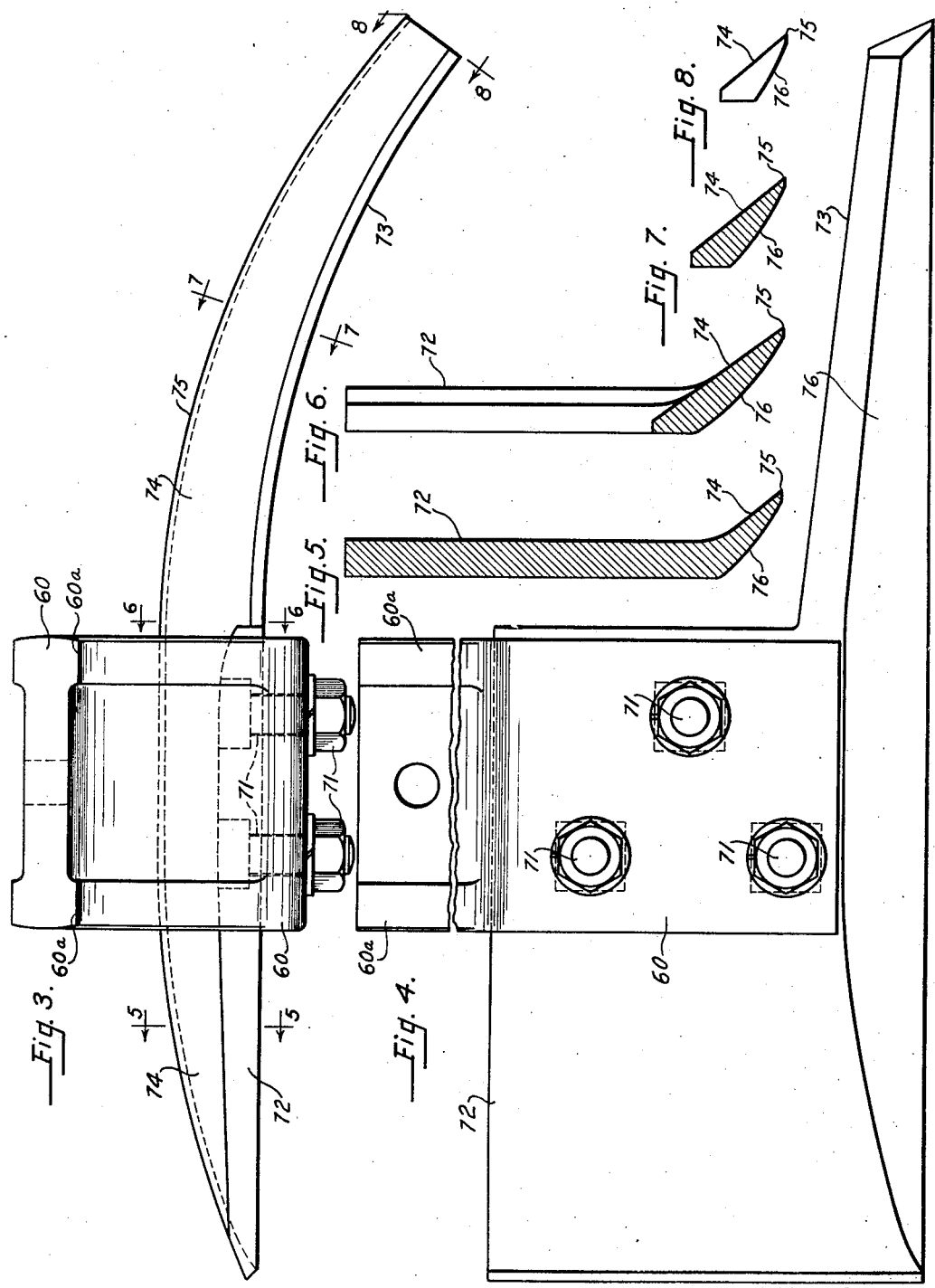

1,969,523

UNITED STATES PATENT OFFICE 1,969,523

SAND MIXER

Axel G. J. Rapp, Evanston, and Alfred C. Christensen, Chicago, Ill., assignors to Herbert S. Simpson, Chicago, Ill.

Application March 4, 1932, Serial No. 596,796

7 Claims. (Cl. 83—45)

REISSUED

It is the object of our invention to provide a muller in which the muller wheels are located the same distance from the center of the mill but offset radially.

It is a further object to provide a muller in which the plow arms are not hinged but are held rigidly against the bottom of the muller pan and are mounted upon the same brackets that support the rocking muller wheels.

It is a further object to provide means of adjustably limiting the extent of the rocking of the muller wheels, locating the adjusting means on opposite sides of the main axis of the main shaft so as to equally dispose the load on the center line of the muller.

It is a further object to provide a muller turret entirely independent of the main base plate and to support the main drive shaft in this turret in such a position that the main driving gears are enclosed within an oil-tight casing.

A simplified shock absorber type of muller adjustment is provided employing rubber cushions for the muller adjustment screws.

It is a further object to provide in connection with the oil-tight casing means to not only lubricate the driving gearing but the bearings of the driving shaft which is mounted in a separate detachable bearing support sleeve so that one common pool of lubricant can be utilized for lubricating the entire driving mechanism.

It is a further object to provide a single unitary casting for the mullers and the scrapers and for limiting the movement of the mullers.

It is an object to provide a novel form of attaching means for the scraper support and a novel form of scraper, particularly the scraper adjacent the muller wheels.

Referring to the drawings:

Figure 1 is a top plan view of the muller;

Figure 2 is a section on the line 2—2 of Figure 1;

Figure 3 is a top plan view of the bracket and scraper for the muller wheel;

Figure 4 is a detail front elevation of the lower end thereof;

Figure 5 is a section on the line 5—5 of Figure 3;

Figure 6 is a section on the line 6—6 of Figure 3;

Figure 7 is a section on the line 7—7 of Figure 3;

Figure 8 is a section on the line 8—8 of Figure 3.

Referring to the drawings in detail, 1 indicates the supporting legs for the base plate 2 constituting the supporting bottom of the muller pan. Mounted on the base 2 are detachable wear plates 3. Within the flange 4 are mounted the side wall plates 5 and 6 forming the sides of the pan. The central portion of the base 2 has recesses as at 7 provided with shoulders 8 on which are mounted the flanges 9 of the detachable turret 10 which is attached thereto by the bolts 11. The heads of these bolts are counter sunk in the space 7 below the general level of the base 2 so that the plates 3 will overlap and cover the heads of the bolts 11 and engage the surface 12 around the turret 10 thus forming an interlocking construction which serves to further position laterally the turret structure and to enclose the attaching means for the turret. This makes a tight joint against the leakage of sand downwardly around the turret while, at the same time, provides a detachable turret with all the advantages that are inherent in that construction.

Suspended from the bottom of the base 2 is a drum 13 forming an oil reservoir which is bolted to the base 2 by the bolts 14 where the flanges 15 and 16 overlap.

The base of this drum 13 is closed by a detachable pan 17 attached by the bolts 18 to the flange 19 of the drum 13. This pan is provided with a drain plug 20. The drum 13 is provided with an oil overflow cock 21. One side of the drum 13 is provided with an aperture in which is inserted a detachable bearing sleeve 22 bolted to the sleeve 23 of the drum by the bolts 24.

In this sleeve 22 are spaced bearings 25 and 26 supporting the driving shaft 27. This sleeve 22 is in open communication with the oil in the base of the drum 13 for lubrication purposes. A beveled pinion 28 is mounted on the inner end of this shaft 27 within the drum 13 which engages with the beveled gear 29 mounted on the lower end of the driven shaft 30 which is mounted in bearings 31 and 32 within the muller turret 10. These bearings are held in position by a bottom plate 33 detachably mounted by the bolts 34 on the bottom of the turret 10 and by a cap plate 35 held in position by the bolts 36 on the top of the turret.

Above this cap plate mounted upon the driven shaft 30 is a single casting generally designated 37 which carries oppositely-disposed muller supporting arms 38 and 39 carrying the muller shafts 40 and 41. Arranged between these oppositely-disposed arms 38 and 39 are the muller adjusting brackets 42 and 43, the centers of which are in line with the central axis 44 of the driven shaft 30. These adjusting arms are provided with sockets 45, rubber cushions 46 and wear plates 47 which are engaged by the muller adjusting screws 48. The muller adjusting screws are carried on brackets 49 on the muller arms 50 which carry the mullers 51. It will be noted that these mullers are placed the same distance from the center of the mill but are offset radially. Mounted on each of the arms 38 and 39 are detachable brackets 52 and 53 held thereon by the bolts 54, the inner ends of the brackets as at 55 forming eyes for the reception of the retaining nuts 56 on the ends of the shafts 40 and 41 that support the mullers. Thus, the shafts that support the mullers with their nuts 56 also act as a partial retaining means for the brackets 53 having arcuate faces that carry the vertical arms 57 having the scrapers 58 on the lower ends thereof solidly against the bottom plates 3 of the muller pan.

Additional inner scrapers 59 are held by the arms 60 in arcuate faces of the brackets 61 on the respective extensions 38 and 39 carried by the muller casting 37.

It will be noted that the adjusting screws 48 are in alignment with the axis 44 and are oppositely disposed on either side of that axis so that the load is equally carried and the entire structure is balanced.

The scrapers are likewise equidistantly and proportionately disposed on either side of the axis 44 so that their load is disposed at substantially right angles to the oppositely-disposed load of the adjusting screws 48.

The mullers 51 are mounted on their own muller shafts 62 carried in bearings 63 and 64 in the muller wheels 51. Detachable end plates 65 and 66 are bolted on either side of the muller wheels 51. The end plates 66 carry the hub cap 67. The inner end of the shaft 62 is retained in position in the collar 62a of the arm 50 by the clamping plate 68 and bolt 69.

The supporting arms 57 and 60 are provided with shoulders 60a which engage with the interior arcuate surfaces 61 on the brackets supporting the several arms 57 and 60. These depending arms 57 and 60 are retained by bolts 70. The lower ends of the arms are provided with bolt holes and bolts 71 for attaching the arms to the scrapers.

In Figures 3, 4, 5, 6, 7 and 8 are shown in various views the muller scrapers comprising a vertically-disposed plate 72 and a laterally extending, tapered, scraping finger 73 having an angular flat front face 74 terminating in a sharp edge 75 and a rearward arcuate surface 76.

It will be understood that we desire to comprehend within our invention such modifications as may be necessary to adapt it to varying conditions and uses.

Having thus fully described our invention, what we claim as new and desire to secure by Letters Patent, is:

1. In combination in a muller, of a muller pan, a vertically-disposed central driving shaft, a bracket means mounted thereon and turning therewith having oppositely-disposed parallel axles for supporting muller wheels, muller wheels pivotally supported on one end of the axles, clamping means on the other ends of the axles, and scraper-blade brackets rigidly held between said clamping means and said bracket means for supporting scrapers rigidly adjacent the bottom of the pan.

2. In combination in a muller, of a muller pan, a vertically disposed driving shaft, bracket means mounted thereon having oppositely-disposed branches, axles mounted in said branches parallel to one another, arms mounted on one end of each of said axles, mullers rotatably mounted on the ends of said arms, and brackets for supporting scrapers mounted on said oppositely-disposed bracket means, and clamping means on the other ends of the axles, said scraper brackets being rigidly held between said clamping means and bracket means for cooperatively retaining said brackets for the scrapers on the bracket means supporting said axles.

3. In combination in a muller, of a muller pan, a vertically disposed driving shaft, bracket means mounted thereon having oppositely-disposed branches, axles mounted in said branches parallel to one another, arms mounted on one end of said axles, mullers rotatably mounted on the ends of said arms, brackets for supporting scrapers mounted on said oppositely-disposed bracket means, clamping means on the other ends of the axles, the scraper-blade brackets being rigidly held between said clamping means and bracket means, and additional scrapers and arms therefor on the bracket means supporting the axles.

4. In a muller, a muller pan, a vertically-disposed driving shaft, a bracket thereon having oppositely-disposed axle arms and oppositely-disposed muller adjusting screw abutments located between said arms, axles on the arms for supporting muller arms, muller arms on one end of said axles, mullers on said muller arms, adjusting screws on said arms, cushions on the abutments engaged by the adjusting screws, said mullers being located on opposite sides of the driving shaft an equal distance from the center thereof to offset radially thereof, and clamping means on the other ends of the axles, and scraper-blade brackets rigidly held between said clamping means and said bracket means, said axles being arranged to assist and retain said scraper brackets in position thereon.

5. In a muller, a muller pan, a vertically-disposed driving shaft, a bracket thereon having oppositely-disposed axle arms and oppositely-disposed muller adjusting screw abutments located between said arms, axles on the arms for supporting the muller arms, muller arms on one end of said axles, mullers on said muller arms, adjusting screws on said arms, said mullers being located on opposite sides of the driving shaft an equal distance from the center thereof to offset radially thereof, scrapers and their brackets mounted on the other ends of said axles, said axles extending beyond the scraper brackets, and clamping means located on the extended ends of the axles beyond the scraper-blade brackets, said brackets being rigidly held between said clamping means and the first mentioned brackets, and additional scrapers and their brackets mounted on the shaft bracket.

6. In a muller, a muller bed plate having side walls, legs for supporting said bed plate, an oil-tight reservoir supported therebeneath, a driving shaft and gearing associated therewith and lubricated by the lubricant therein, muller mechanism above said bed plate driven by said driving mechanism, a detachable turret mounted over said oil reservoir and on said bed plate, and wear plates overlapping the joint between the turret and bed plate engaging with said detachable turret to prevent the leakage of sand through the joint between the turret and the bed plate into the oil reservoir.

7. In a muller, a muller bed plate having side walls mounted thereon, legs for supporting said bed plate, an oil-tight reservoir supported therebeneath, driving shafts and gearing associated therewith and lubricated by the lubricant therein, muller mechanism above said bed plate driven by said driving mechanism, a turret mounted over said oil reservoir and detachably connected with said bed plate, wear plates on said bed plate engaging with said detachable turret and overlapping the joint between the turret and the bed plate to prevent the leakage of sand through the joint between the turret and the bed plate into the oil reservoir, and detachable closure means on either end of said turret for enclosing and supporting bearings therein supporting a portion of the driving mechanism mounted therein.

AXEL G. J. RAPP.
ALFRED C. CHRISTENSEN.